(12) United States Patent
Velkey et al.

(10) Patent No.: US 11,541,885 B2
(45) Date of Patent: Jan. 3, 2023

(54) LOCATION PREDICTION FOR DYNAMIC OBJECTS

(71) Applicant: Robert Bosch GmbH, Stuttgart (DE)

(72) Inventors: Geza Velkey, Ipolyszog (HU); Kornel Istvan Kis, Tapoica (HU); Levente Kis, Budapest (HU); Peter Korosi-Szabo, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 16/577,159

(22) Filed: Sep. 20, 2019

(65) Prior Publication Data

US 2020/0094823 A1 Mar. 26, 2020

(30) Foreign Application Priority Data

Sep. 26, 2018 (DE) .......................... 102018216417.7

(51) Int. Cl.
*G06F 17/10* (2006.01)
*G06G 7/78* (2006.01)
(Continued)

(52) U.S. Cl.
CPC ........... *B60W 30/0956* (2013.01); *G06N 3/08* (2013.01); *G06V 20/58* (2022.01); *G06V 40/103* (2022.01);
(Continued)

(58) Field of Classification Search
CPC .......... B60W 30/0956; B60W 2254/00; G06K 9/00369; G06K 9/00805; G06N 3/08; G08G 1/166
(Continued)

(56) References Cited

U.S. PATENT DOCUMENTS

2012/0271538 A1* 10/2012 Lee .......................... G08G 9/02
701/117
2015/0085082 A1* 3/2015 Zierke .................. H04N 13/282
348/48
(Continued)

FOREIGN PATENT DOCUMENTS

CN       108564118 A  *  9/2018
DE    102011101246 A1    11/2012
(Continued)

OTHER PUBLICATIONS

English Translation for CN108564118A (Year: 2021).*

*Primary Examiner* — Mahmoud S Ismail
(74) *Attorney, Agent, or Firm* — Norton Rose Fulbright US LLP; Gerard Messina

(57) ABSTRACT

A control system and a method for predicting a location of dynamic objects, for example, of pedestrians, which are able to be detected by the sensors of a vehicle. The control system includes a multitude of sensors and a processing system, which is configured to combine with a first program the objects that are detected by the multitude of sensors to form an object list, each entry of the object list encompassing the location, a speed and an open route for each of the objects, and the object list including a time stamp; and to determine with a second program for at least a portion of the dynamic objects an additional object list from a predefined number of object lists, the additional object list including a time stamp for a future point in time and encompassing at least the location of the dynamic objects.

13 Claims, 3 Drawing Sheets

(51) Int. Cl.
   *G08G 1/16*      (2006.01)
   *B60W 30/095*    (2012.01)
   *G06N 3/08*      (2006.01)
   *G06V 20/58*     (2022.01)
   *G06V 40/10*     (2022.01)

(52) U.S. Cl.
   CPC ......... *G08G 1/166* (2013.01); *B60W 2554/00* (2020.02)

(58) Field of Classification Search
   USPC ........................................................ 701/301
   See application file for complete search history.

(56) References Cited

U.S. PATENT DOCUMENTS

| | | | | |
|---|---|---|---|---|
| 2017/0251347 | A1* | 8/2017 | Mehta | H04W 4/90 |
| 2018/0191195 | A1* | 7/2018 | Krompa | G06Q 50/06 |
| 2019/0072646 | A1* | 3/2019 | Zelen | G01S 13/66 |
| 2019/0236955 | A1* | 8/2019 | Hu | G08G 1/096844 |
| 2019/0354785 | A1* | 11/2019 | Samii | G06N 5/046 |
| 2020/0192393 | A1* | 6/2020 | Aragon | B60W 50/085 |

FOREIGN PATENT DOCUMENTS

| | | |
|---|---|---|
| DE | 102014008578 A1 | 12/2015 |
| DE | 102014215124 A1 | 2/2016 |
| DE | 102015122824 A1 | 7/2016 |

\* cited by examiner

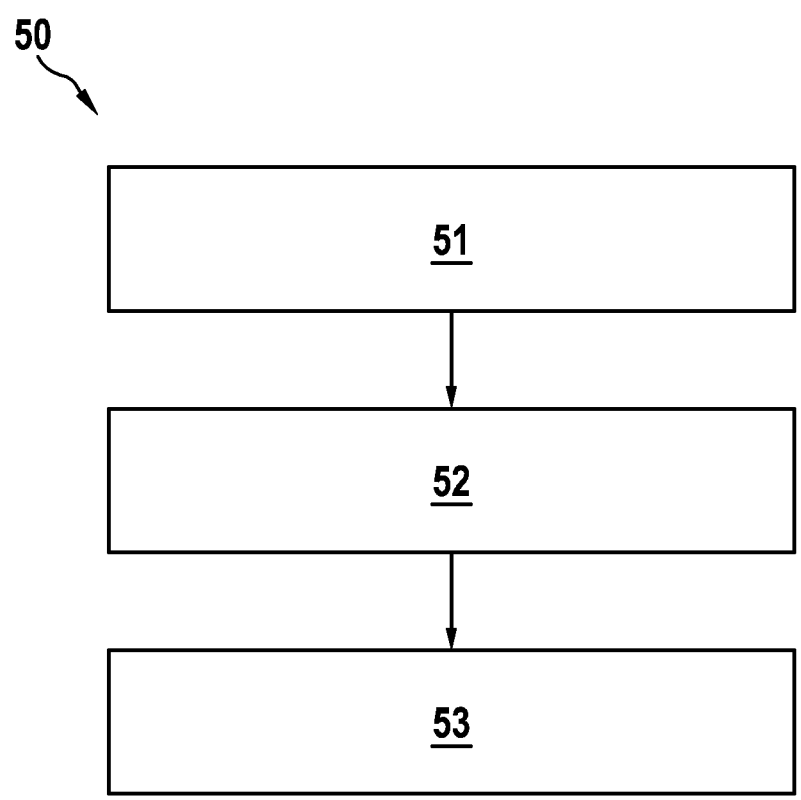

LOCATION PREDICTION FOR DYNAMIC OBJECTS

RELATED APPLICATION INFORMATION

The present application claims priority to and the benefit of German patent application no. DE 10 2018 216 417.7, which was filed in Germany on Sep. 26, 2018, the disclosure of which is incorporated herein by reference.

FIELD OF THE INVENTION

The present invention relates to a control system for a vehicle and to a method for predicting a location of dynamic objects, for example, of pedestrians, which are able to be detected by the sensors of the vehicle.

BACKGROUND INFORMATION

The detection of the dynamic surroundings of a vehicle is a task that is presently able to be achieved in many situations only with very high computing power. For vehicles that offer a high degree of driver support or for vehicles driving in an at least partially automated manner, for example, the prediction of a location of dynamic objects is important, in particular, in order to avoid and/or to prevent collisions.

SUMMARY OF THE INVENTION

One aspect of the present invention relates to a control system for a vehicle. A vehicle may be a land vehicle, in particular, a passenger car, truck, bus or a special-purpose vehicle. A control system for predicting a location of dynamic objects includes a multitude of sensors and a processing system. The dynamic objects may, for example, be pedestrians, bicyclists or other road users, in particular, road users, whose movements may deviate significantly from a linear or uniform movement. The sensors may, for example, use one or multiple cameras, LIDAR, radar or other sensor mechanisms.

The processing system is configured to combine with the aid of a first program the objects that are detected by the multitude of sensors to form an object list. Such programs which carry out the combining of objects, for example, to form a so-called worldview, are meanwhile available, at least in some forms, as packets.

The objects are displayed in an object list, each entry of the object list including the location, a speed and an open route for each object, and the object list including a time stamp. These specifications may, for example, be recorded in the memory of a processing system; the specifications in this case corresponding to specifications in the real world. Thus, spatial coordinates may, for example, correspond to GPS coordinates or (optionally standardized) distances to a vehicle, for example to the vehicle, in which or on which the sensors are situated. In one specific embodiment, the location is represented as spatial coordinates or as polar coordinates.

The speeds are vectors, which are represented in many specific embodiments in a manner similar to the spatial coordinates in the processing system. The open route may, for example, be represented by two spatial coordinates, for example, as the distance to an adjoining static and/or dynamic object. The open route may be part of a surroundings description, which may be stored in a memory to which the processing system may have access. Thus, there is a sequence of object lists, each of which includes a time stamp. In one specific embodiment, the time stamps may be equidistant, in another specific embodiment the frequency of the creation of a time list may be a function of surroundings factors, for example, of the number of dynamic objects.

The processing system is further configured to determine with the aid of a second program an additional object list for at least a portion of the dynamic objects from a predefined number of object lists, the additional object list including a time stamp for a future point in time and encompassing at least the location of the dynamic objects. Thus, an additional object list or a predefined number of additional object lists is generated. This takes place on the basis of a predefined number of object lists that have been created in the past; an object list may also be created in the present. These object lists use a second program for projecting, i.e., for generating, an object list that determines the attributes of the objects in the future. Linear or non-linear projection methods, for example, may be used for this purpose. With this arrangement, the projection of a location of dynamic objects, for example, of pedestrians able to be detected by the sensors of a vehicle, will be significantly improved, i.e., accelerated and/or rendered more precisely.

Another aspect of the present invention relates to a method for a vehicle driving in an at least partially automated manner. The method is used for predicting a location of dynamic objects in the surroundings of the vehicle. The dynamic objects may, for example, be other vehicles, pedestrians, bicyclists or other road users, in particular, road users whose movements may deviate significantly from a linear or uniform movement.

The method includes the steps:

detecting objects with the aid of a multitude of sensors;

combining the objects with the aid of a first program to form an object list, each entry of the object list including the location, a speed and an open route for each of the objects, and the object list including a time stamp; and determining with the aid of a second program an additional object list for at least a portion of the dynamic objects from a predefined number of object lists, the additional object list including a time stamp for a future point in time and encompassing at least the location of the dynamic objects.

The sensors may, for example, use one or multiple camera(s), LIDAR, radar or other sensor mechanisms. Thus, the sensors detect the dynamic objects, for example, with the aid of a single sensor or also with the aid of a combination of sensors, various types of sensors also capable of being combined such as, for example, signals from the cameras with signals from the radar sensors. The first program combines the objects detected by the multitude of sensors to form the object list. In this case, each entry of the object list encompasses the location, a speed and an open route for each of the objects. The object list also includes a time stamp. These specifications correspond, for example, to specifications in the real world. Thus, spatial coordinates may, for example, correspond to GPS coordinates or (optionally standardized) distances to a vehicle, for example, to a vehicle in which or on which the sensors are situated. In one specific embodiment, the location is represented as spatial coordinates or polar coordinates.

Thus, one of the entries in the object list may correspond to a bicycle in the real world, in particular, to a moved bicycle. The bicycle is located at a particular location at a certain point in time. The certain point in time in this case corresponds, for example, to a first time stamp of the object list. The location may, for example, be represented by spatial coordinates in the object list. The bicycle has a speed; this speed may, for example, be represented by a vector of spatial coordinates in the object list. The bicycle also has an open route, which may be represented, for example, as an end point. Similarly, the location, speed and open route of an additional object, for example, of a pedestrian, may be determined and entered in the object list. This entry may be displayed in this example in the same object list and may also bear the first time stamp.

Based on these data of the object list and/or of additional object lists which, for example, have been created at an earlier point in time and which bear another time stamp, an additional object list is determined with the aid of the second program for at least a portion of the dynamic objects—in this example for the bicycle and the pedestrian, for example. The additional object list includes a time stamp for a future point in time and encompasses at least the location of the dynamic objects. In this case, the objects may, for example, move linearly or non-linearly. It may therefore be calculated on the basis of this object list, for example, whether a collision of the bicycle or of the pedestrian with the vehicle could occur at the future point in time. The vehicle may be activated using this piece of information. In cases in which a potential collision with the vehicle is calculated, the vehicle may, for example, influence the braking system and/or the steering system, i.e., steer away from the location of the potential collision or decelerate, for example.

In one specific embodiment, the second program uses a so-called LSTM methodology; this abbreviation refers to so-called "long short-term memory" methods. These involve recurrent neural networks. These methods are used in order to process sequential data, in particular, chronologically sequential data, i.e., in this case, in order to determine rules and the values for the additional object list, which encompasses at least the location of the dynamic objects. In the process, the LSTM forms abstractions of the data, on the basis of which they have been trained. These abstractions of the data are advantageously applied here in order to model the interactions of the various detected objects. Thus, for example, a non-linear movement may be detected. In the above example, a situation could be identified, for example, in which the bicycle evades the pedestrian and as a result, with the aid of the determination of the additional object list, could result in a potential collision, which could result in an action of the vehicle.

In one specific embodiment, the second program uses so-called "social LSTM networks". In this form, behavior patterns of humans in gatherings of humans, in particular, are taken into consideration. The social LSTM networks advantageously use the principle of locality, i.e., that the objects are influenced with a particularly high degree of probability by the objects in their surroundings, in particular, their immediate surroundings. In the example cited here, the probability that the bicycle reacts to a movement of the pedestrian could be higher than a reaction to an object further away.

If this assumption is violated, i.e., influenced by objects in their surroundings, a back-up model is resorted to in such case. Social LSTM networks in this case model each of the objects individually. In one specific embodiment, a grid is formed around the vehicle, and objects in the same grid area (or in the same cell of the grid) interact. In this way, a type of "communication" between the objects is modelled, for example, pedestrians who evade one another or a bicycle. This type of "communication" between the objects for example is advantageously utilized in such case.

In this way, the prediction of a location of dynamic objects may continue to be significantly improved. In one specific embodiment, artificial neural networks are trained with these pieces of information; as opposed to other methods such as, for example, a rule-based detection of possible projections of locations, it is possible, based on examples, to identify the most important, the most frequent and/or the most critical situations and thus to significantly improve the prediction and/or the responses of the control system.

In one specific embodiment, each entry of the object list also encompasses a probability. This may further increase the reaction speed of the vehicle, because in this way, entries having a lower probability may be treated differently from entries having a higher probability. Thus, entries having a higher probability, for example, may be treated with greater predictive depth or in some processing systems earlier and/or with higher priority or their treatment may be discontinued.

In one specific embodiment, the location is represented, at least for a portion of the objects, as a bivariate normal distribution. In many cases, the exact size is entered in the object list if the size of the objects is known. In cases, for example, in which the size of the objects is not known, a bivariate normal distribution may be entered instead.

In one specific embodiment, distances are represented logarithmically, at least for a portion of the objects. This is particularly advantageous when the distances represented for the various objects vary significantly, or also when an object further removes itself, for example, in the case of a lower prediction. In one specific embodiment, the logarithmic representation may be used as a function of the distance of the objects. In some cases, a lower accuracy may be used in the logarithmic representation. This takes into consideration, in particular, the behavior of vehicles, which move at different speeds in different surroundings.

In one specific embodiment, the time stamps include an interval of 10 ms to 500 ms, in particular, of 50 ms to 200 ms. The interval of the time stamps is a function of, among other things, the speed of the host vehicle.

In one specific embodiment, the object list represents a tensor. This has proven to be a particularly meaningful methodology for the representation of a number of scenarios.

Another aspect of the present invention relates to a program element which, when executed in a processing system, is configured to carry out the method described herein.

Another aspect of the present invention relates to a computer-readable medium, on which the aforementioned program element is stored.

BRIEF DESCRIPTION OF THE DRAWINGS

FIG. 3 schematically shows the representation of a method according to one specific embodiment of the present invention for predicting a location of dynamic objects.

DETAILED DESCRIPTION

Figure 1:
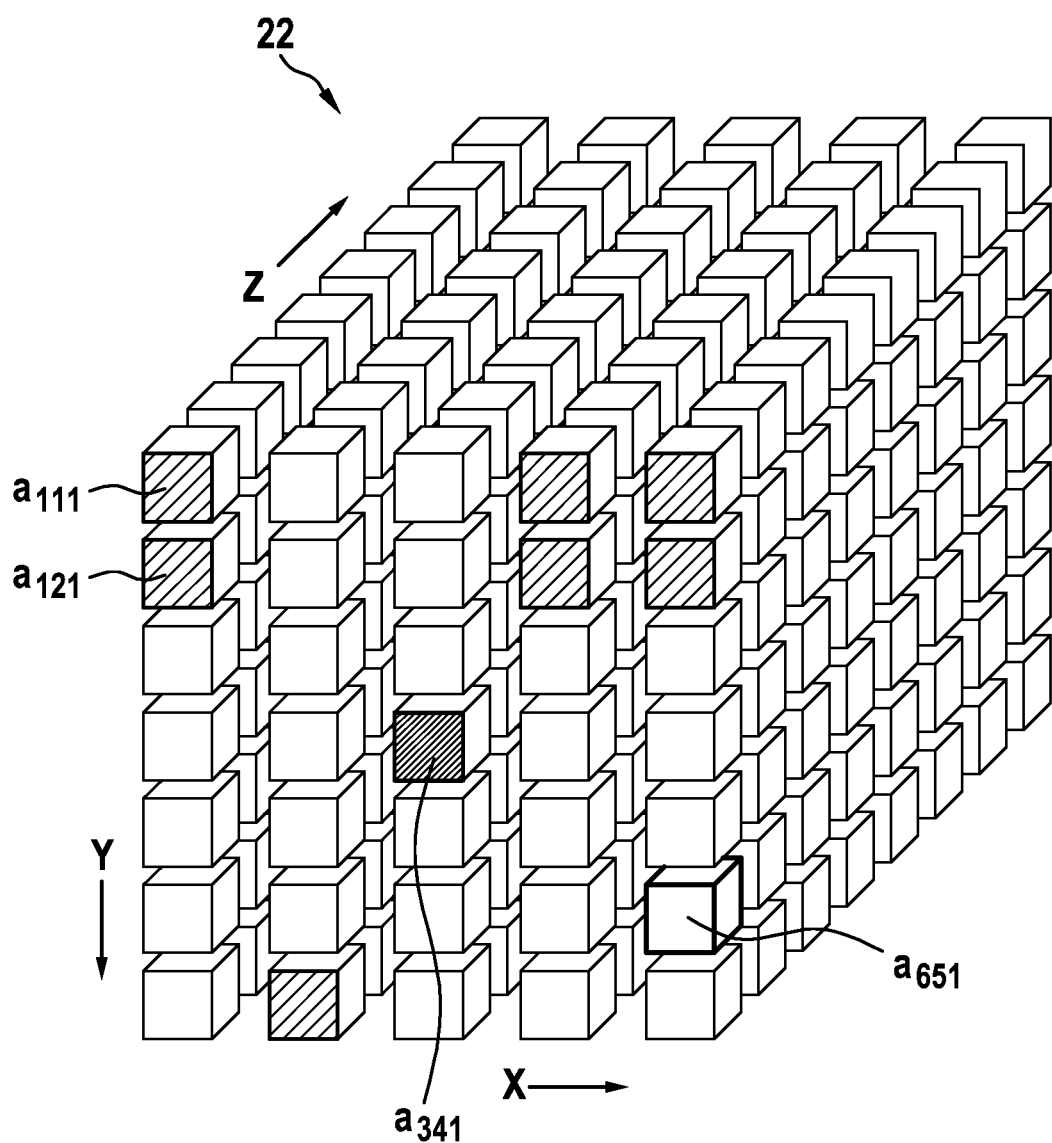
FIG. 1 schematically shows the representation of an object list according to one specific embodiment of the present invention.

FIG. 1 schematically shows the representation of an object list 22. The individual dynamic objects 20 are represented in this object list as small cubes and identified by $a_{xyz}$. In this representation, the x axis and y axis are the location coordinates of the objects; the z axis represents the attributes of the objects. Thus, object $a_{651}$ displayed at the bottom right identifies an object located at position x=6 and y=5, having the first attribute. The number of attributes for each object is the same in the example shown; in other specific embodiments, however, a variable number of attributes is also possible. In the example shown, brightly delineated objects $a_{111}$ and $a_{121}$ are detected or identified foreign objects, for example, $a_{111}$ may denote a pedestrian and $a_{121}$ may denote a bicyclist. Darkly delineated object $a_{341}$ may be the host vehicle. Thus, each of the objects, if spatial coordinates are used as in this example, is assigned an x-y position. The location may be represented as a bivariate normal distribution. The scale of the x-y position may be linear or, at least for a portion of objects 20, logarithmic. At least one speed and one open route of the object are stored in the attribute list for each of objects 20. Object list 22 further includes a time stamp; the time stamp is not displayed since it is a property of entire object list 22.

Figure 2:
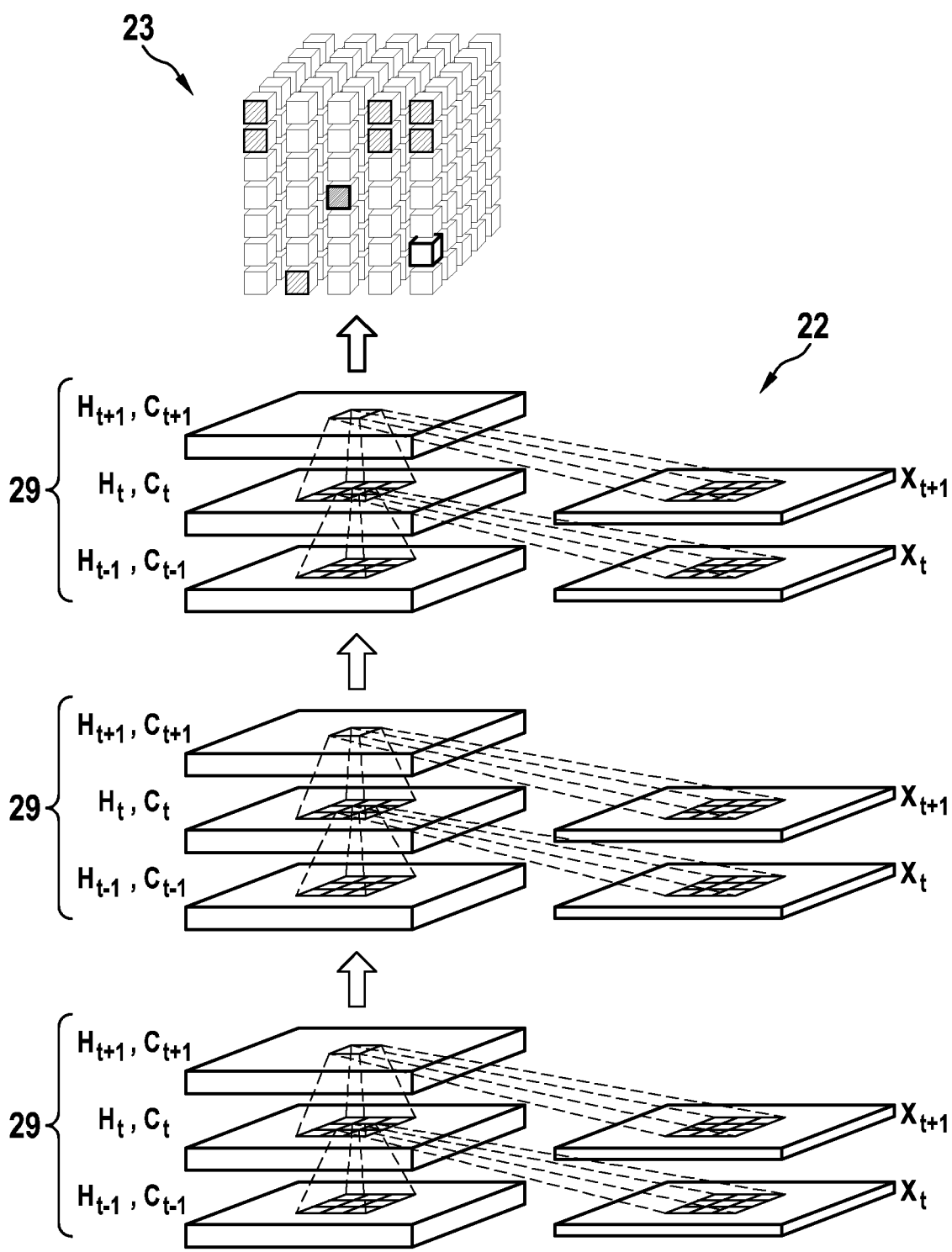
FIG. 2 schematically shows the representation of a sequence of object lists according to one specific embodiment of the present invention.

FIG. 2 schematically shows the representation of a sequence of object lists 22, which results in the determination of an additional object list 23. Additional object list 23 in this case is a prediction from the sequence of object lists 22. Thus, object list 23 includes a time stamp for a future point in time.

Three levels 29 of the prediction are shown in FIG. 2. Each of the levels 29 includes two object lists 22, which encompass observations with detected objects and are identified with $X_t$ or—for the additional step—with $X_{t+1}$. In each level 29, output $C_1$ and the respective next object list 23 are determined—as a prediction—from object lists 22 and from an internal state Hi. In this case, the predictions of the past (i.e., having an older time stamp) may be corrected using detected values before they are adopted from one level 29 into next level 29. This is carried out in the example shown via three levels 29, so that current object list 23 includes to an extent the "experiences" from three steps of the past. A second program is used for the prediction. The second program may use a LSTM methodology, in particular, a social LSTM networks methodology.

FIG. 3 schematically shows the representation of a method 50 for predicting a location of dynamic objects 20. Dynamic objects 20 may, for example, be pedestrians, bicyclists or other road users, in particular, road users whose movement may deviate significantly from a linear or uniform movement. In a step 51, dynamic objects 20 are detected with the aid of a multitude of sensors 30. Sensors 30 may, for example, use one or multiple cameras, LIDAR, radar or other sensor mechanisms.

In step 52, objects 20 are combined with the aid of a first program to form an object list 22. In this case, each entry of the object list encompasses the location, a speed and an open route for each of the objects, and object list 22 includes a time stamp. The time stamps are created in the past or in the present.

In step 53, one or multiple additional object lists 22 are created from a predefined number of object lists 22 with the aid of a second program. Additional object list 23 created with the aid of the second program includes a time stamp for a future point in time and encompasses at least the location of dynamic objects 20.

What is claimed is:

1. A control system for a vehicle for driving in at least a partially automated manner, for predicting locations of dynamic objects in surroundings of the vehicle, comprising:
    a multitude of sensors;
    a processing system to combine with a first program the dynamic objects, which are detected by the multitude of sensors, to form a plurality of object lists, wherein each entry of the object list encompasses the location, including spatial coordinates, a speed, a probability and an open route for each of the dynamic objects, and the object list including a time stamp; and
    determining, with the processing system, an additional object list for at least a portion of the dynamic objects from a predefined number of object lists with a second program, wherein the additional object list includes a time stamp for a future point in time and encompasses at least the location of the dynamic objects;
    wherein the dynamic objects include pedestrians or other road users,
    wherein there is a sequence of the object lists, each of which includes a time stamp, wherein the time stamps are equidistant, or wherein a frequency of creation of an object list is a function of surroundings factors, including a number of the dynamic objects, and
    wherein the additional object list is a prediction from a sequence of the object lists, and wherein the prediction of the location of the dynamic objects is used by the processing system to avoid and/or to prevent collisions with the dynamic objects.

2. A method for a control system of a vehicle for driving in at least a partially automated manner, for predicting locations of dynamic objects in surroundings of the vehicle, the method comprising:
    detecting the dynamic objects with a multitude of sensors;
    combining, with a processing system, the dynamic objects with a first program to form a plurality of object lists, wherein each entry of the object list encompasses the location, including spatial coordinates, a speed, a probability and an open route for each of the dynamic objects, and the object list includes a time stamp; and
    determining, with the processing system, for at least a portion of the dynamic objects an additional object list from a predefined number of object lists with a second program, wherein the additional object list includes a time stamp for a future point in time and encompasses at least the location of the dynamic objects;
    wherein the dynamic objects include pedestrians or other road users,
    wherein there is a sequence of the object lists, each of which includes a time stamp, wherein the time stamps are equidistant, or wherein a frequency of creation of an object list is a function of surroundings factors, including a number of the dynamic objects, and
    wherein the additional object list is a prediction from a sequence of the object lists, and wherein the prediction of the location of the dynamic objects is used by the processing system to avoid and/or to prevent collisions with the dynamic objects.

3. The method of claim 2, wherein the second program uses a long short-term memory (LSTM), including social LSTM networks, using a locality principle, in which the dynamic objects are influenced with a particular probability by the dynamic objects in the surroundings of the dynamic objects, and wherein if the dynamic objects are not influenced by the dynamic objects in the surroundings of the dynamic objects, then a backup model is used in which the social LSTM networks model each of the dynamic objects individually.

4. The method of claim 3, wherein the social LSTM networks are used in which a grid is formed around the vehicle, and the dynamic objects, in a same grid area or in a same cell of the grid, interact, so that a communication between the dynamic objects is modelled.

5. The method of claim 2, wherein each entry of the object list also encompasses a probability.

6. The method of claim 2, wherein the location, at least for a portion of the dynamic objects, is represented as a bivariate normal distribution.

7. The method of claim 2, wherein distances, at least for a portion of the dynamic objects, are represented logarithmically.

8. The method of claim 2, wherein the time stamp includes an interval of 10 ms to 500 ms.

9. The method of claim 2, wherein the object list represents a tensor.

10. The method of claim 2, wherein the time stamp includes an interval of 50 ms to 200 ms.

11. A non-transitory computer-readable medium having a computer program, which is executable in a processing system, comprising:
 a program code arrangement having program code for a vehicle for driving in at least a partially automated manner, for predicting locations of dynamic objects in surroundings of the vehicle, by performing the following:
  detecting the dynamic objects with a multitude of sensors;
  combining, with the processing system, the dynamic objects with a first program to form a plurality of object lists, wherein each entry of the object list encompasses the location, including spatial coordinates, a speed, a probability and an open route for each of the dynamic objects, and the object list includes a time stamp; and
  determining, with the processing system, for at least a portion of the dynamic objects an additional object list from a predefined number of object lists with a second program, wherein the additional object list includes a time stamp for a future point in time and encompasses at least the location of the dynamic objects;
 wherein the dynamic objects include pedestrians or other road users,
 wherein there is a sequence of the object lists, each of which includes a time stamp, wherein the time stamps are equidistant, or wherein a frequency of creation of an object list is a function of surroundings factors, including a number of the dynamic objects, and
 wherein the additional object list is a prediction from a sequence of the object lists, and wherein the prediction of the location of the dynamic objects is used by the processing system to avoid and/or to prevent collisions with the dynamic objects.

12. The computer-readable medium of claim 11, wherein the second program uses a long short-term memory (LSTM) methodology.

13. An apparatus, for a vehicle for driving in at least a partially automated manner, for predicting a location of dynamic objects in surroundings of the vehicle, comprising:
 a device which is configured to perform the following:
  detecting the dynamic objects with a multitude of sensors;
  combining, with a processing system, the dynamic objects with a first program to form a plurality of object lists, wherein each entry of the object list encompasses the location, including spatial coordinates, a speed, a probability and an open route for each of the dynamic objects, and the object list includes a time stamp; and
  determining, with the processing system, for at least a portion of the dynamic objects an additional object list from a predefined number of object lists with a second program, wherein the additional object list includes a time stamp for a future point in time and encompasses at least the location of the dynamic objects;
 wherein the dynamic objects include pedestrians or other road users,
 wherein there is a sequence of the object lists, each of which includes a time stamp, wherein the time stamps are equidistant, or wherein a frequency of creation of an object list is a function of surroundings factors, including a number of the dynamic objects, and
 wherein the additional object list is a prediction from a sequence of the object lists, and wherein the prediction of the location of the dynamic objects is used by the processing system to avoid and/or to prevent collisions with the dynamic objects.

\* \* \* \* \*